United States Patent
Sasson et al.

(10) Patent No.: US 6,728,261 B1
(45) Date of Patent: Apr. 27, 2004

(54) ATM OVER IP

(75) Inventors: Israel Sasson, Petah Tikva (IL); Gonen Zilber, Petah-Tikva (IL); Gil Biran, Raananna (IL)

(73) Assignee: Axerra Networks, Ltd., Tel Aviv (IL)

( * ) Notice: Subject to any disclaimer, the term of this patent is extended or adjusted under 35 U.S.C. 154(b) by 0 days.

(21) Appl. No.: 09/499,213

(22) Filed: Feb. 7, 2000

(51) Int. Cl.$^7$ .................................................. H04J 3/16
(52) U.S. Cl. ........................ 370/466; 370/474; 370/401
(58) Field of Search .............................. 370/466, 401, 370/395.1, 395.5, 395.51, 395.52, 474

(56) References Cited

PUBLICATIONS

Sitaram Kowtha, Encapsulating ATM Cells in TCP/IP for Transport Between ATM Based Backbone and End–User Terminals, to Enable Real–Time Network–Aware Services, dated May 27, 1999, published in IEEE proceeeings pp. 195–203.*

* cited by examiner

Primary Examiner—Douglas Olms
Assistant Examiner—Robert W. Wilson
(74) Attorney, Agent, or Firm—Katten Muchin Zavis Rosenman (57) ABSTRACT

A system and method of implementing interworking function (IWF) between ATM and IP protocols and networks. The interworking function provides mapping and encapsulation functions necessary to ensure service provided to networks/protocols is unchanged. An ATM service specific convergence sublayer (ATM-SSCS) translates between the ATM layer and RTP/UDP/IP sublayer.

13 Claims, 11 Drawing Sheets

Figure 4:
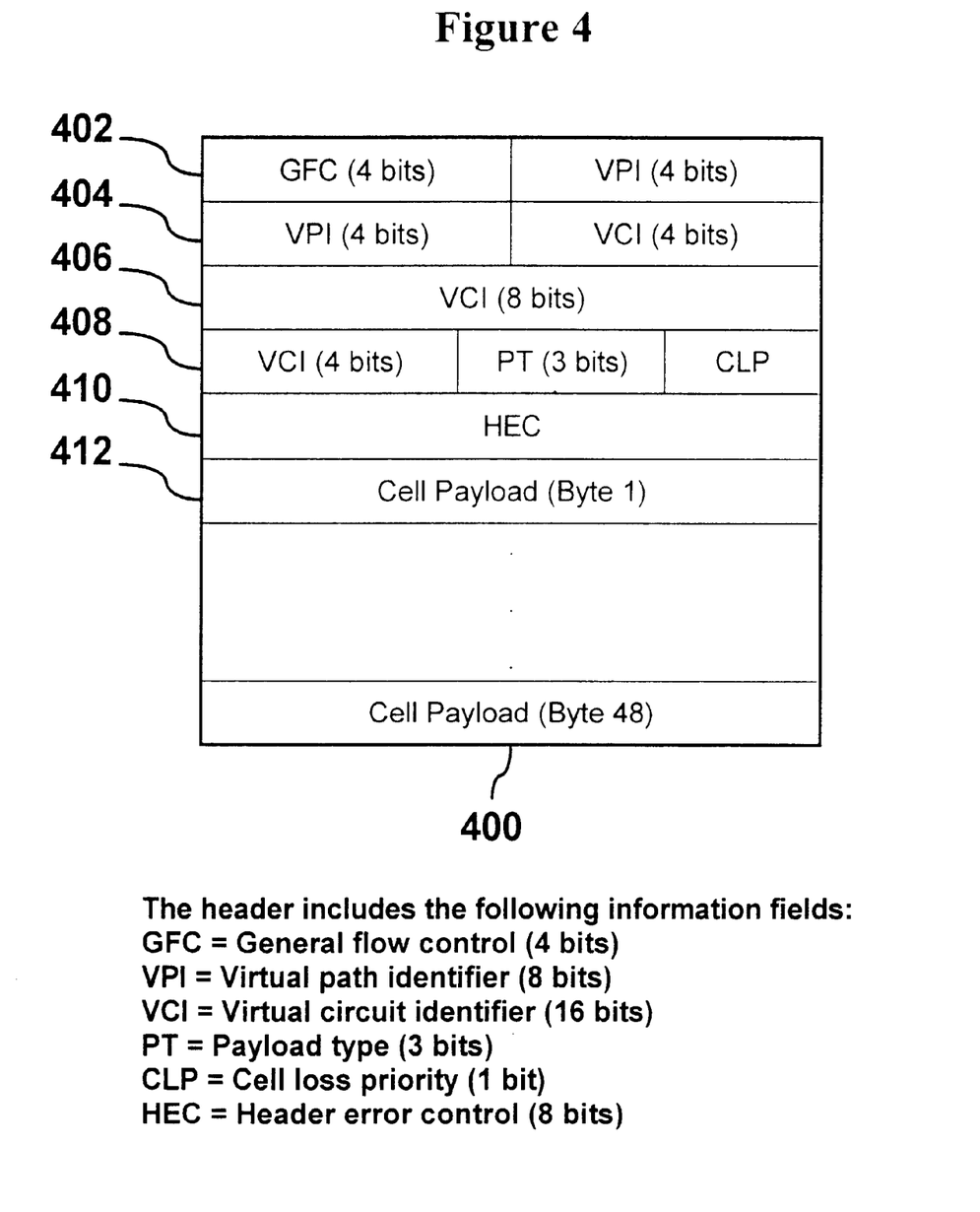
FIG. 4 illustrates the structure of the ATM cell structure.

The header includes the following information fields:
GFC = General flow control (4 bits)
VPI = Virtual path identifier (8 bits)
VCI = Virtual circuit identifier (16 bits)
PT = Payload type (3 bits)
CLP = Cell loss priority (1 bit)
HEC = Header error control (8 bits)

ATM OVER IP

BACKGROUND OF THE INVENTION

1. Field of Invention

The present invention relates generally to the field of communication protocols. More specifically, the present invention is related to transferring a ATM protocol over an Internet protocol.

2. Discussion of Prior Art

ATM, short for Asynchronous Transfer Mode, represents a network technology based on transferring data in cells of a fixed size. The cell used with ATM is relatively small (53 bytes) compared to units used with older technologies. The small, constant cell size allows ATM equipment to transmit video, audio, and computer data over the same network, and assure that no single type of data hogs the line.

Current implementations of ATM support data transfer rates of from 1.544 (T1) to 622 Mbps (megabits per second). This compares to a maximum of 1000 Mbps (GbETH) for Ethernet, the current technology used for most LANs.

Some people think that ATM holds the answer to the Internet bandwidth problem, but others are skeptical. ATM creates a fixed channel, or route, between two points whenever data transfer begins. This differs from TCP/IP, in which messages are divided into packets and each packet can take a different route from source to destination. This difference makes it easier to track and bill data usage across an ATM network, but it makes it less adaptable to sudden surges in network traffic.

When purchasing ATM service, you generally have a choice of four different types of service: Constant Bit Rate (CBR) specifies a fixed bit rate so that data is sent in a steady stream. This is analogous to a leased line. Variable Bit Rate (VBR) provides a specified throughput capacity but data is not sent evenly. This is a popular choice, however, for voice and video conferencing data. Unspecified Bit Rate (UBR) does not guarantee any throughput levels. This is used for applications, such as file transfer, that can tolerate delays. Available Bit Rate (ABR) provides a guaranteed minimum capacity but allows data to be bursted at higher capacities when the network is free.

The present communications revolution has been focused on the Internet and World Wide Web (WWW) with emphasis on the Internet protocol (IP). The prior art has failed to teach a viable solution to handling ATM (ATM) over Internet Protocol (IP).

Each of the below described references teach methods of interworking functioning (IWF) for differing protocols across various communication standards. However, none of the references provide or suggest the present invention method of ATM over IP.

The patent to Essigmann (5,850,391), assigned to Telefonaktiebolaget L M Ericsson, provides for a Shared Interworking Function Within a Mobile Telecommunications Network. Essigmann discloses a method and apparatus for communicating interworking function (IWF) control data between a mobile switching center (MSC) and a telecommunication node as illustrated in FIG. 5 (5,850,391). The serving MSC encapsulates the identified IWF control data into an optional parameter within an integrated service digital network user part (ISUP) signal. The MSC then transmits the ISUP signal encapsulating the IWF control data towards the telecommunications node.

The patent to St-Pierre et al. (5,901,352) provides for a System for Controlling Multiple Networks and Associated Services. This reference describes a system for enabling network convergence and interworking between multiple communication networks. FIG. 1 (5,901,352) illustrates telecommunication network (10) with mobile switching center (30) that includes interworking function (IWF) for providing communication over different protocols.

The patent to Bhalla et al. (5,949,773), assigned to Motorola, Inc., provides for a Method for Transferring a Data Signal in a Wireless Communications System. Disclosed is a system for transferring a data signal in a comunication system. Source selection distribution unit (SDU) (248) in FIG. 3 (5,949,773) converts incoming data signal (107) to ATM switched virtual circuit (ATM SVC) protocol suitable for conversion by source interworking function (IWF) (214), thus eliminating the need for protocol conversion by source SDU (170).

The non-patent literature entitled, "Trends for 1999: Interworking Between ATM and IP networks", Network World Fusion, Jan. 1, 1999 (www.nwfision.com) provides a brief look at IP traffic bound for a destination on a ATM network which gets concentrated to one or more sites. At these sites, routers (or a routing function) also know the IP addresses at the ends of the ATM PVC's, this is for IP over ATM networks and not ATM over IP networks.

The patent to Pepe et al. (5,742,668), assigned to Bell Communications Research, Inc. provides for a personal internetwork over wireless or wire-line communication mediums.

Whatever the precise merits, features and advantages of the above cited references, none of them achieve or fulfills the purposes of the present invention. These and other objects are achieved by the detailed description that follows.

SUMMARY OF THE INVENTION

A system and method of implementing interworking function (IWF) between ATM and IP protocols and networks. The interworking function provides mapping and encapsulation functions necessary to ensure that service (protocols) provided to networks is kept unchanged. The present invention provides a ATM service specific convergence sublayer (ATM-SSCS) necessary to translate between the ATM layer and RTP/UDP/IP sublayer.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 1:
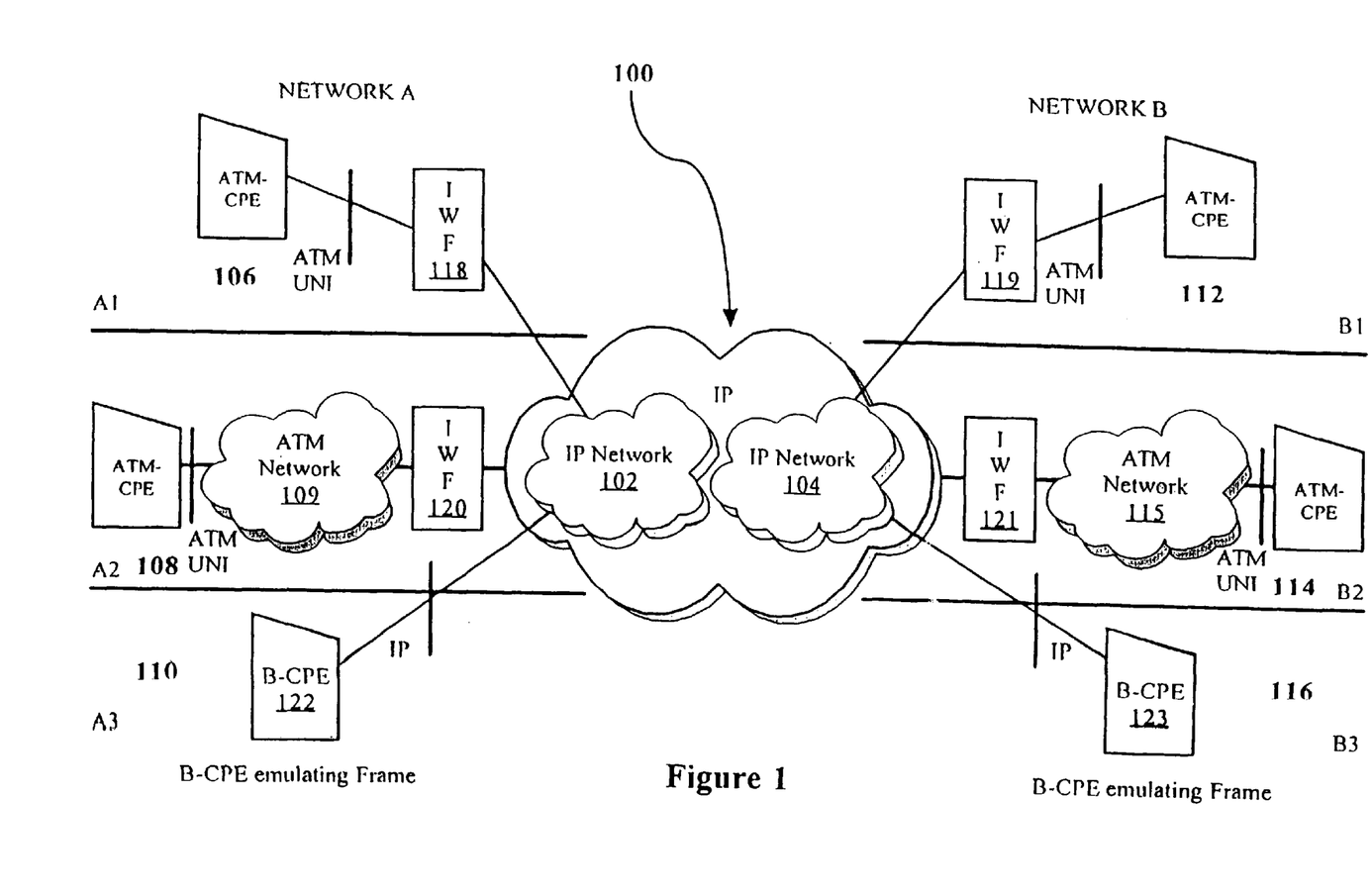
FIG. 1 illustrates ATMS support on an IP-based Multi-Service Interface.

FIG. 1 illustrates ATMS support on an IP-based Multi-Service Interface. An IP network 100, comprising one or more IP Networks 102 and 104, according to the present invention, supports variously configured connections to ATM networks ATM-CPE "A1–A3" and "B1–B3" (106, 108, 110 and 112, 114, 116, respectively). A1 and B1 illustrate ATM processing connections through interworking functions 118 and 119, respectively. A2 and B2 illustrate a ATM processing connections carried across ATM Networks 109 and 115 through interworking functions 120 and 121, respectively. Configurations A3 and B3 illustrate CPEs that also support ATM encapsulation. These CPEs can support Protocol mapping, but from the IWF view, it doesn't make any difference whether they are sent to B1, B2, or B3.

The interconnections A1–A3 and B1–B3 lead to 6 possible reference configurations. A complete list of reference configurations is:

1—A1 to B1
2—A1 to B2
3—A1 to B3
4—A2 to B2
5—A2 to B3
6—A3 to B3

Figure 2:
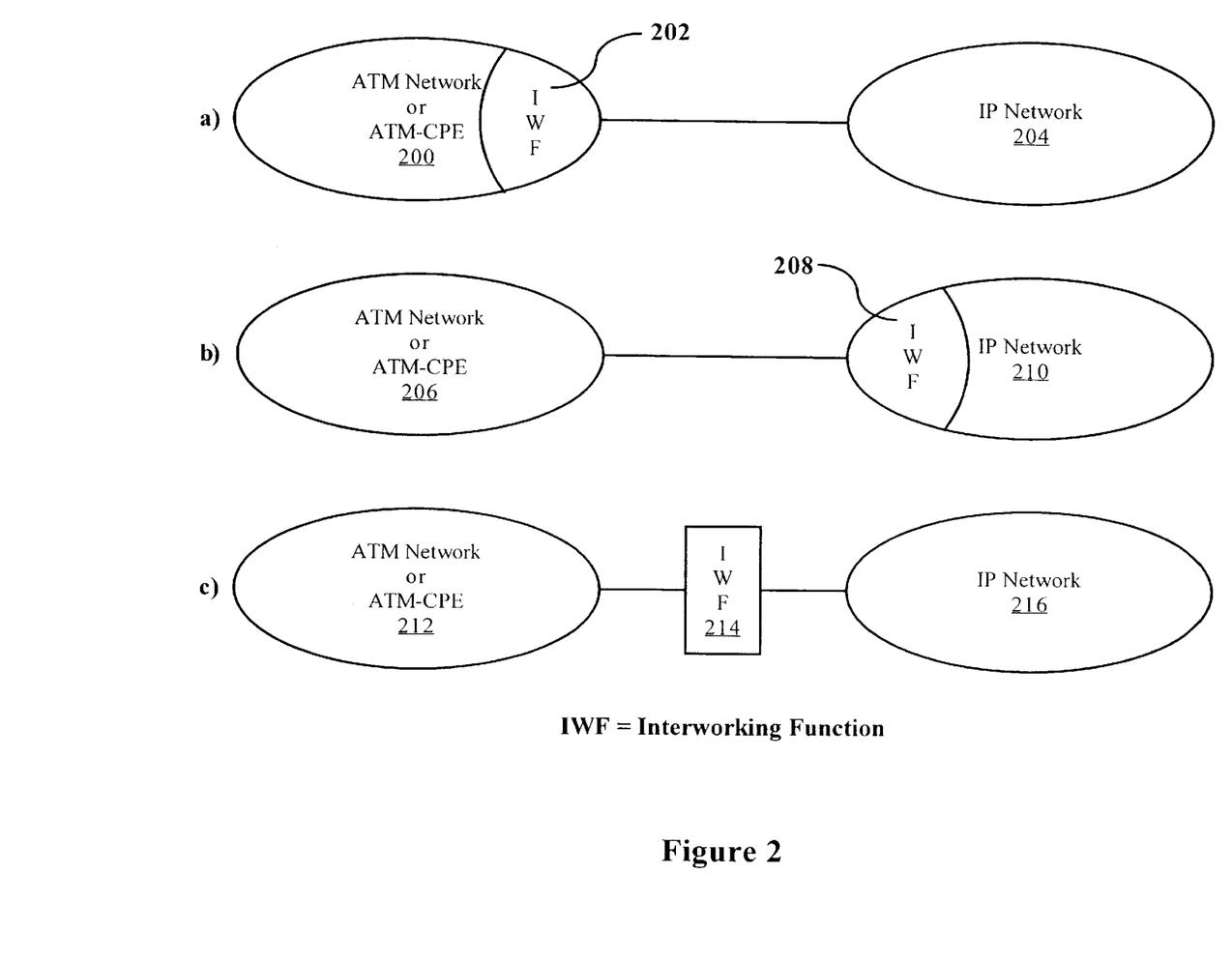
FIG. 2 illustrates equivalent realizations of IWF.

FIG. 1 does not imply any particular physical location for an IWF. FIG. 2 illustrates equivalent realizations of IWF. As shown, configuration "a" comprises placing the IWF 202 at the ATM source 200 before connection with the destination IP network 204. Configuration "b" comprises placing the IWF 208 at access to the destination IP network and configuration "c" comprises placing the IWF 214 in-between the ATM source 212 and the destination IP network 216.

Figure 3:
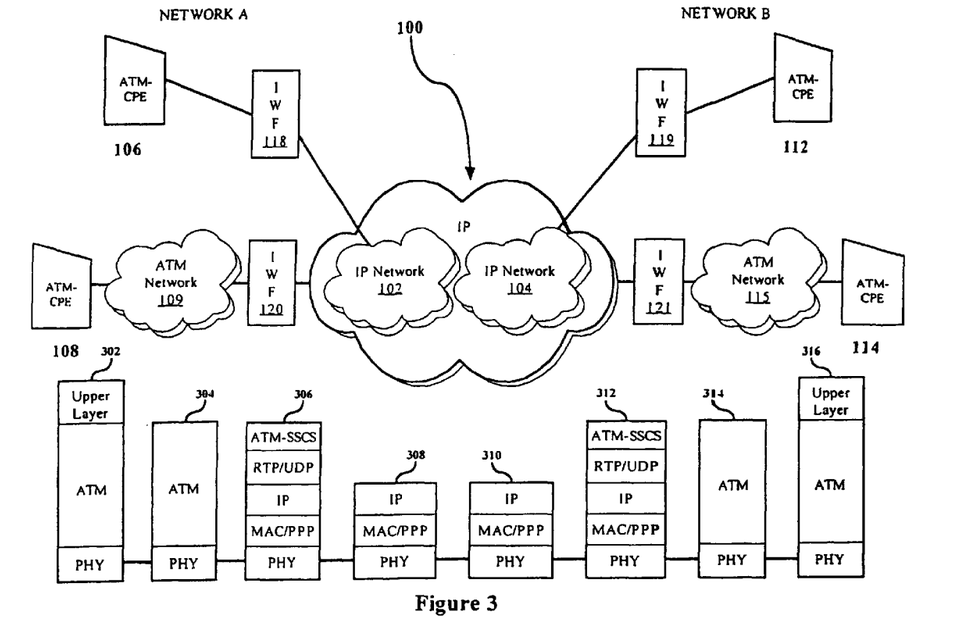
FIG. 3 illustrates Network Interworking.

FIG. 3 illustrates an overview of the present invention Network Interworking. Specifically, elements 302 through 316 illustrate the OSI models, including sub-layers, for each of the frames of elements 102 through 121. ATM-CPE 108 includes sub-layers Upper Layer, ATM, and PHY 302. ATM Network 109 includes sub-layers ATM and PHY 304. IWF 120 includes sub-layers ATM-SSCS, RTP/UDP, IP, MAC/PPP, and PHY 306. IP Network 102 includes sub-layers IP, MAC/PPP, and PHY 308. Elements 104, 114, 115, and 121 reflect identical structures.

FIG. 4 illustrates the structure of the ATM cell. As shown, each cell has a 5-byte header that carries the control data, and a 48-byte information field (cell payload) 412, for a total of 53 bytes. The first header 402 comprises a 4-bit general flow control (GFC) and 4-bit virtual path identifier (VPI). The second header 404 comprises a 4-bit virtual path identifier (VPI) and a 4-bit virtual circuit identifier (VCI). The third header 406 comprises an 8-bit virtual circuit identifier (VCI). The fourth header 408 comprises a 4-bit virtual circuit identifier (VCI), 3-bit payload type(PT) and 1-bit cell loss priority (CLP). The fifth header 410 comprises an 8-bit header error control(HEC).

DETAILED DESCRIPTION OF PREFERRED EMBODIMENTS

The following descriptions describe the present invention system and methods to implement interworking between ATM and IP protocols and networks. The open system interface OSI Model comprises a plurality of layers as shown below:

7 Application Layer
  Program-to-program communication.
6 Presentation Layer
  Manages data representation conversions.
  For example, the Presentation Layer would be responsible for converting from EBCDIC to ASCII.
5 Session Layer
  Responsible for establishing and maintaining communications channels. In practice, this layer is often combined with the Transport Layer.
4 Transport Layer
  Responsible for end-to-end integrity of data transmission.
3 Network Layer
  Routes data from one node to another.
2 Data Link Layer
  Responsible for physical passing data from one node to another.
1 Physical Layer
  Manages putting data onto the network media and taking the data off.

Figure 5:
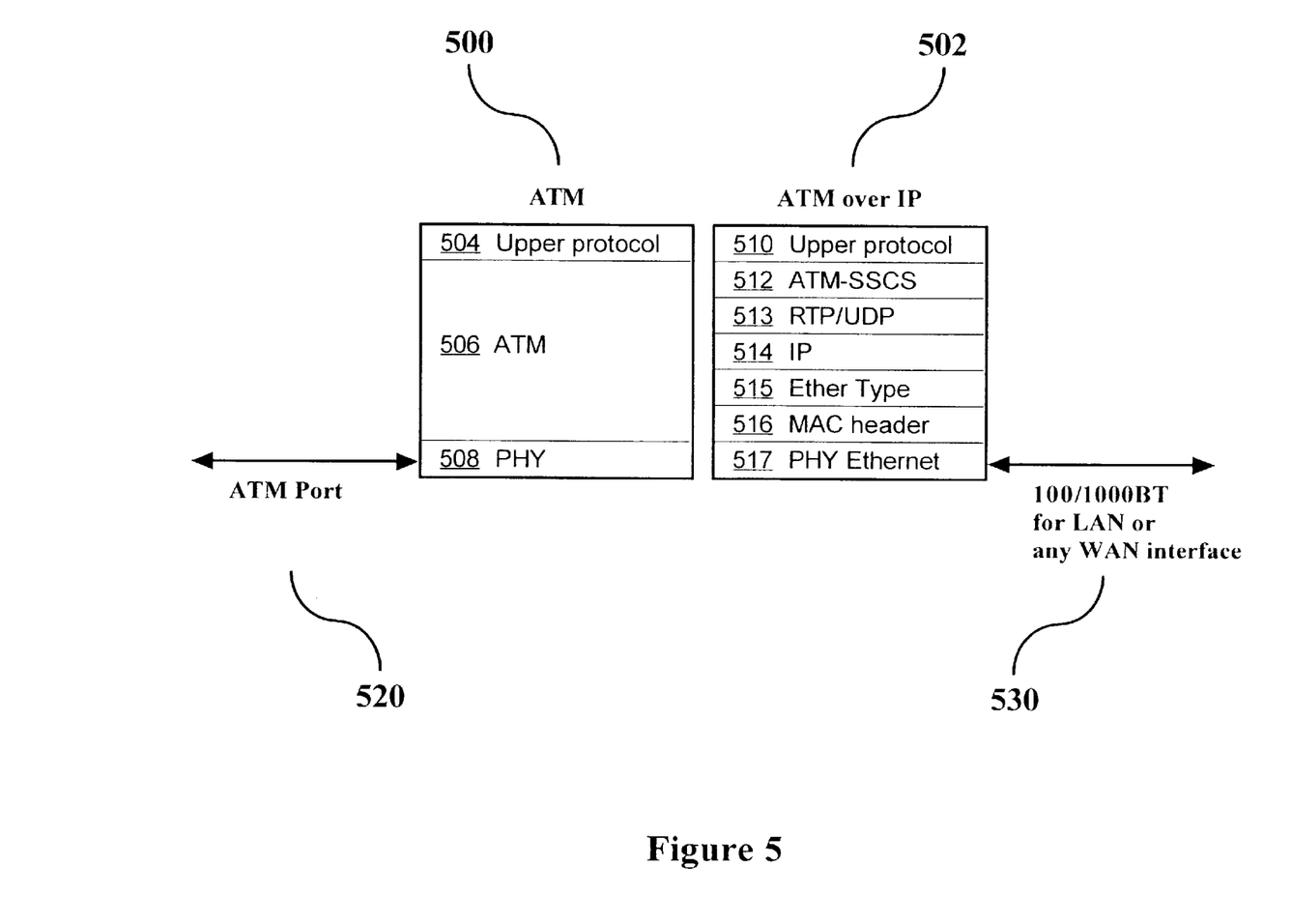
FIG. 5 illustrates the pseudo OSI layers of the Network Interworking.

FIG. 5 illustrates the pseudo OSI layers of the Network Interworking of the present invention. Traffic 520 from an ATM port or any serial interface in the ATM protocol comprises the layers: upper protocol 504 (IP, SNA, or any higher layer protocol), the ATM layer 506 and physical layer (PHY) 508.

The ATM over IP pseudo OSI layers 502 comprise an upper protocol 510, ATM Service Specific Convergence Sublayer (ATM-SSCS) 512 which is necessary to translate between the ATM layer and RTD/UDP/IP sublayers 513 and 514. The User Datagram Protocol (UDP) is a connectionless protocol that, like TCP, runs on top of IP networks. Unlike TCP/IP, UDP/IP provides very few error recovery services, offering instead a direct way to send and receive data grams over an IP network. Sub-layers 515, 516 and 517 provide the Ethernet type, MAC header and PHY Ethernet respectively.

Figure 6:
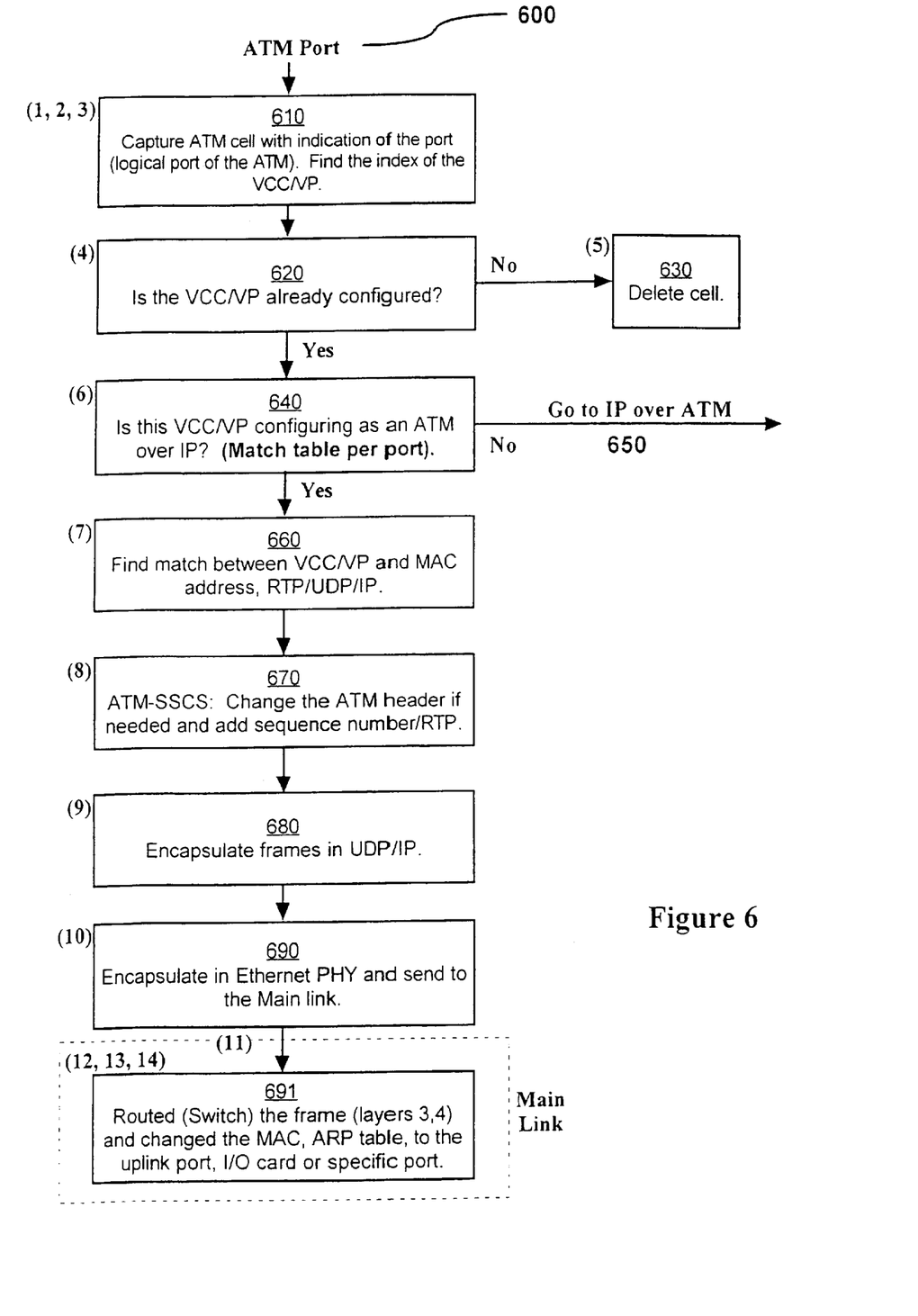
FIG. 6 illustrates a high level flow diagram of flow from the I/O ports.

FIG. 6 illustrates a high level flow diagram of the flow from the I/O ports to the uplink. From ATM port 600 an ATM-cell is captured 610 with an indication of the port (logical port of the ATM) and includes finding the index of the VCC/VP. In step 620, if the VCC/VP of the cell is not already configured, the cell is deleted 630; if the cell is configured, a determination is made if the VCC/VP is configured as ATM over IP 640. If not configured as a ATM over IP, then the cell is sent to determine if it is IP over ATM 650. If configured as ATM over IP, a match is searched located between VCC/VP and MAC addresses, RTP/UDP/IP address 660. At step 670, an ATM Service Specific Convergence Sublayer (ATM-SSCS) is determined; changing the ATM header if needed and adding the sequence number/RTP. The cells are then encapsulated in UDP/IP 680 and further in Ethernet PHY 690 and sent to the main link. At step 691, the frame layers 3,4 are routed and the MAC, ARP table changed to the uplink port I/O card or specific port.

Figure 7:
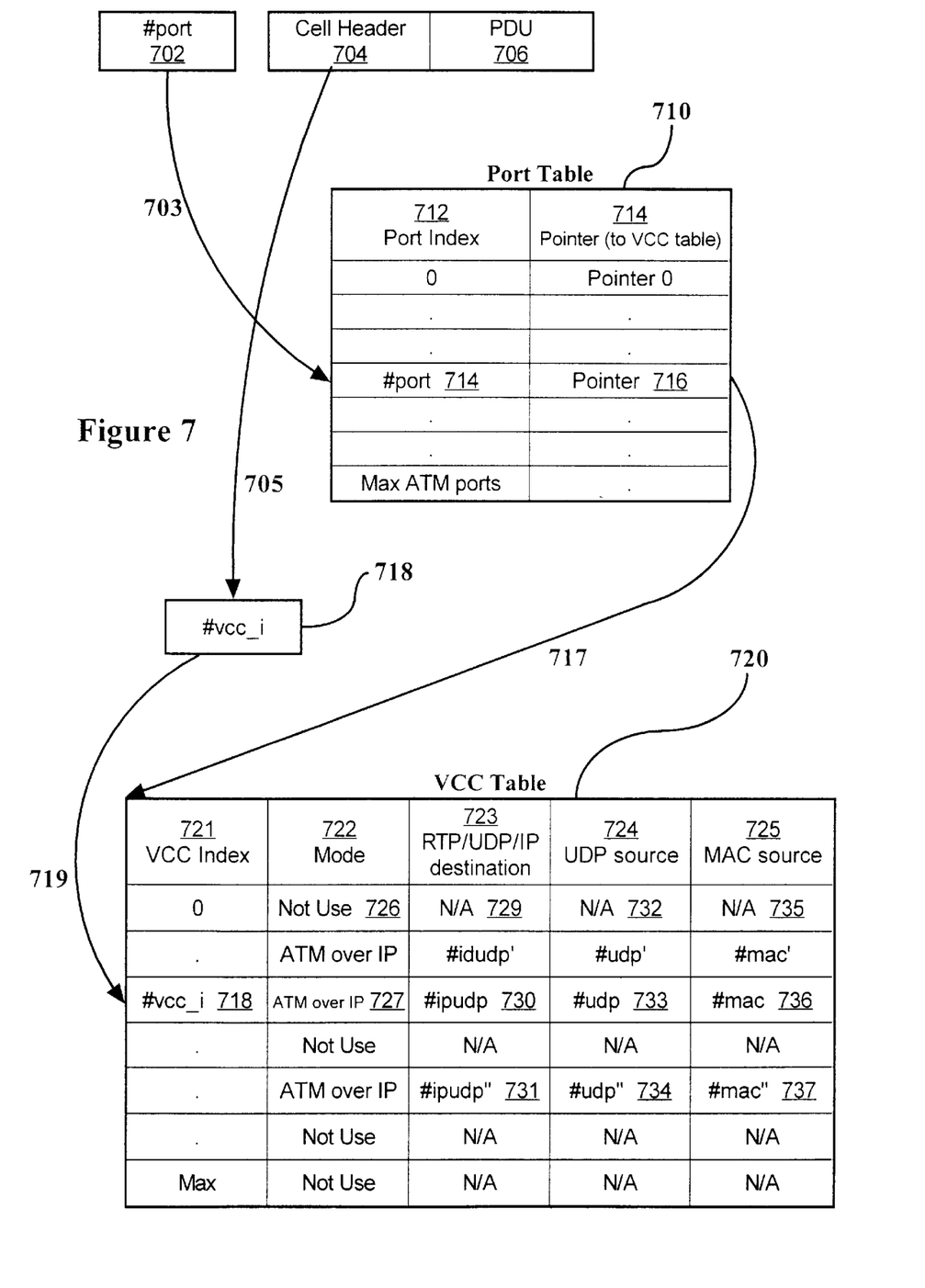
FIG. 7 illustrates flow from the I/O ports.

FIG. 7 illustrates a more detailed flow from the I/O ports toward the uplink. Step numbers below correlate to those shown in FIG. 6 (left-hand side of flow elements).
From the IO ports:
  (1) Receive cell on port number (#port) 702 from the ATM TC layer (TC will delete all idle cells)
  (2) Find by port look-up table 710 pointer 716 to the VCC table of the port #port 714 (port selected by flow 703).

Each port has its own VCC table 720. Each port table comprises an index 712 of ports and a pointer 714 to a VCC table 720 by flow 717. VCC table 720 comprises an index VCC 721, Mode 722, RTP/UDP/IP destination 723, UDP source 724, and MAC source (internal) 725.

(3) Find 705 the index to the VCC/VP from the cell header 704 by using a hash table or CAM. VCC number #vcc 718 (flow 719 to VCC table 720).

(4) Find by look-up table (VCC 720). If this VCC/VP configures to IP over ATM (not shown), ATM over IP 727 is not used 726. This mode determines how to handle this VCC/VP.

(5) If this VCC/IP mode is not used 726, delete the cell and don't continue.

(6) If the mode is ATM over IP 727, (7) Find by look up table (can be the same VCC table) the destination IP and UDP port 723 and the source UDP port 724.

Figure 8:
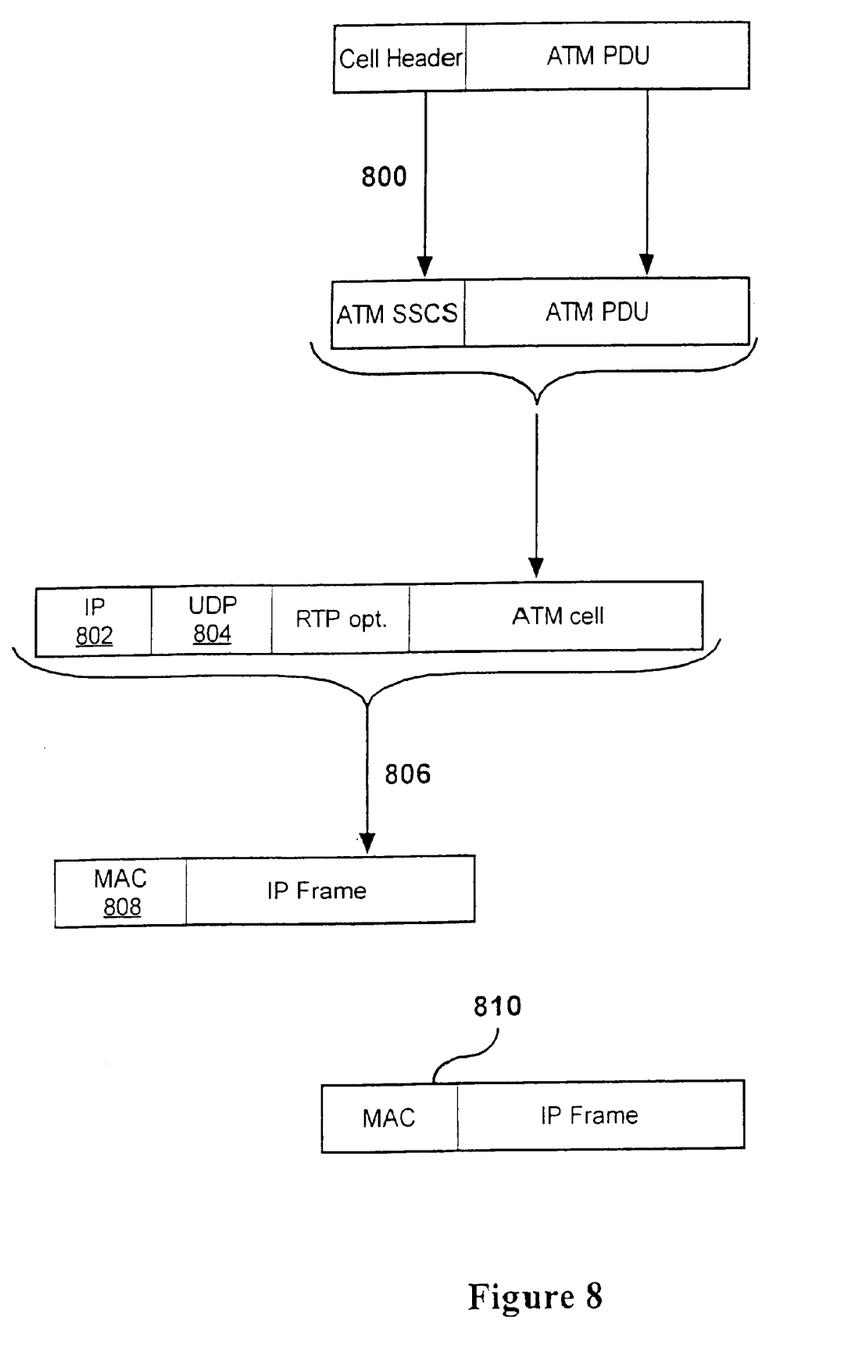
FIG. 8 illustrates the continued flow from FIG. 7 if the mode is ATM over IP.

FIG. 8 illustrates the continued flow from FIG. 7.

(8) Change the cell header, if needed (optional ATM-SSCS) 800.

(9) Encapsulate the cell in UDP/IP 802/804 selected from the VCC table 720.

(10) Encapsulate 806 the frame in MAC layer 808. The destination MAC is the internal MAC of the uplink, the source MAC internal address of the VCC 725.

(11) Send the frame to the uplink 810.

(12) Route the Frame (layer 3,4) to the right direction, usually to the uplink.

(13) Change the destination MAC to the MAC of the GSR (Gigabit Switch Router) and source MAC to the external MAC of the uplink.

(14) Send the frame out through the uplink port.

Figure 9:
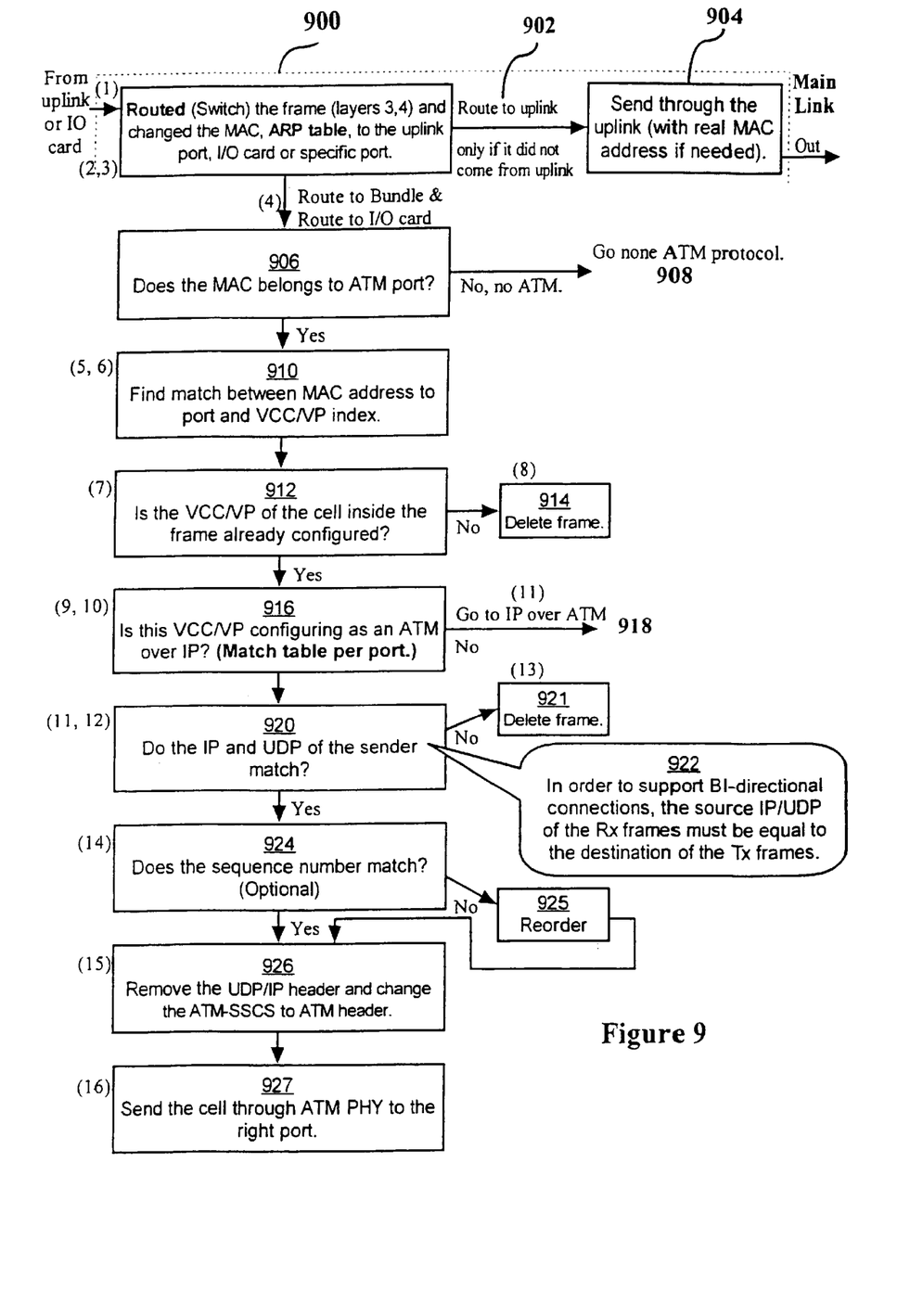
FIG. 9 illustrates a high level flow diagram of flow from the uplink.

FIG. 9 illustrates a high level flow diagram of flow from the uplink to I/O.

Main link 900 includes routing of the frame(layers 3,4) and changing the MAC, ARP table, to the uplink port, I/O card or specific port. If the frame did not come from the uplink, then it can be sent through the uplink (with real MAC address if needed). Otherwise it is routed to the port and I/O card. At step 906, if the MAC belongs to ATM port, the protocol is ATM 908. If yes, then a match is determined between the MAC address to port and VCC/VP index 910. If the VCC/VP of the cell inside the frame is not already configured, it is deleted 914. If it is configured, then a determination is made to determine ATM over IP 916 (match table per port). If it is determined not to be ATM over IP, a determination is made as to whether it is IP over ATM 918. If it is determined to be ATM over IP, a comparison of the IP and UDP of the sender is made 920 (in order to support bi-directional connections, the source UDP/IP of the Rx frames must be equal to the destination of the Tx frames). If they do not match, the frame is deleted 921. A positive comparison yields a progression to check wether the sequence number (RTP) matches 924. If not, reorder of cells is done 925. If it matches, the UDP/IP header is removed and the ATM-SCCS is changed to the ATM header 926. The ATM PHY is then sent to the right port 927.

Figure 10:
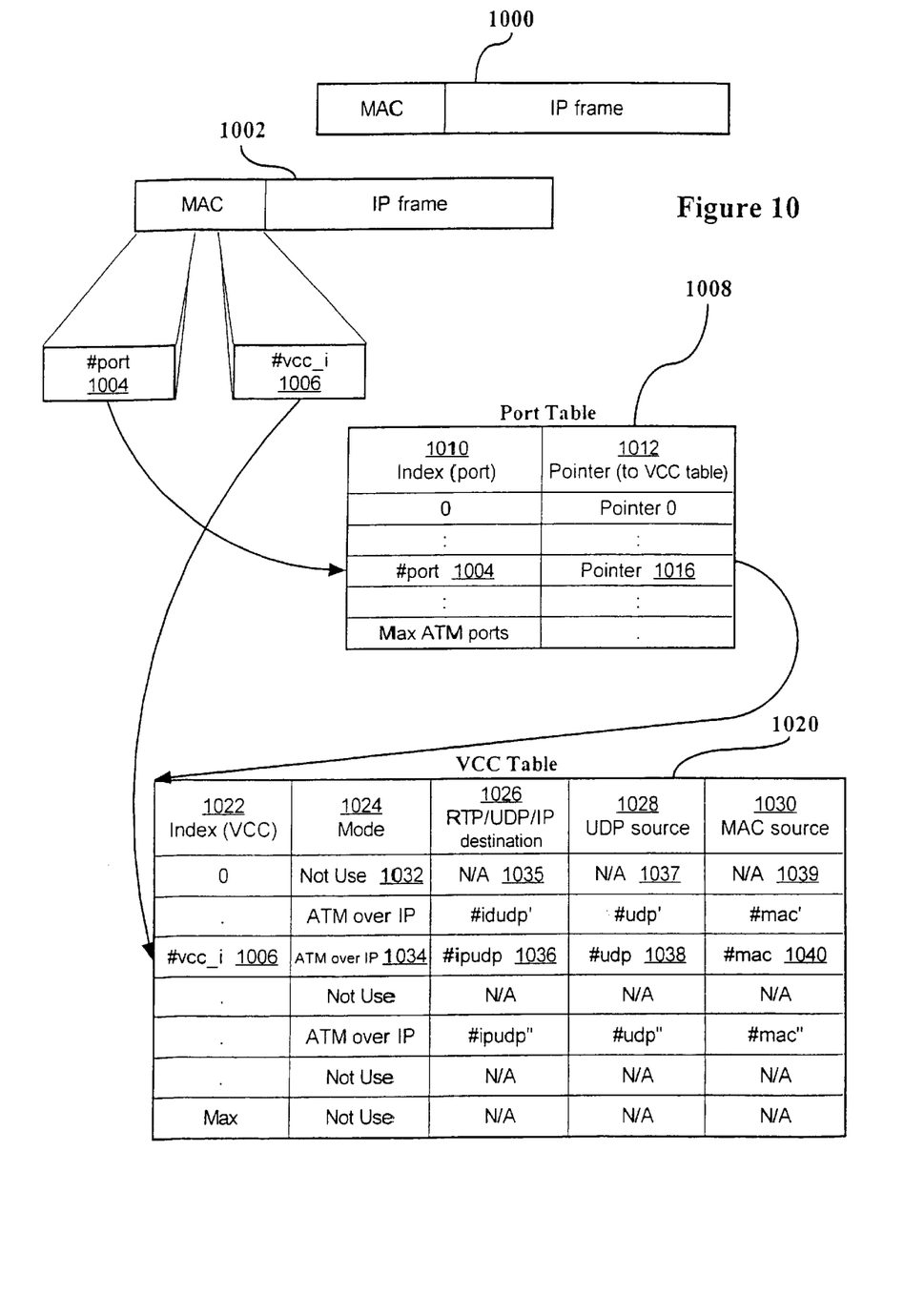
FIG. 10 illustrates flow from the uplink.

FIG. 10 illustrates a detailed flow from the uplink toward the I/O ports (Step numbers below correlate to those shown in FIG. 9 (left-hand side of flow elements):

(1) Receive frame from the uplink port 1000.

(2) Route the frame (layer 3,4) to the right direction.

(3) Change the destination MAC 1002 to the MAC of VCC/VP and source MAC to the internal address of the uplink.

(4) Send the frame to the I/O card.

(5) Find the ATM port number (#port) 1004 and the VCC/VP number (#vcc) 1006 from the MAC.

(6) Find by look-up table 1008 pointer 1016 to the VCC table 1020 of the port #port 1004. Each port has its own table. The table 1008 comprises and index(port) 1010 and related pointer 1012.

(7) Find, by VCC look-up table 1020, if this VCC/VP configures as ATM over IP. VCC table 1020 comprises VCC index 1022, mode 1024, RTP/UDP/IP destination 1026, UDP source 1028, and MAC source (internal) 1030.

(8) If this DLCI is not used 1032, delete the frame.

(9) Remove the MAC layer from the frame.

The mode determines how to handle this frame.

(10) If the mode is ATM over IP 1034, (11) The IP datagram contains UDP, RTP is optional and ATM cell.

Find by look-up table (can be the same VCC table 1020) the destination IP and RTP/UDP port 1036.

(12) Compare them with the UDP of the source of that frame.

(13) If they are not equal delete the frame.

If they are equal:

(14) Check the sequence number of the RTP, optional.

Figure 11:
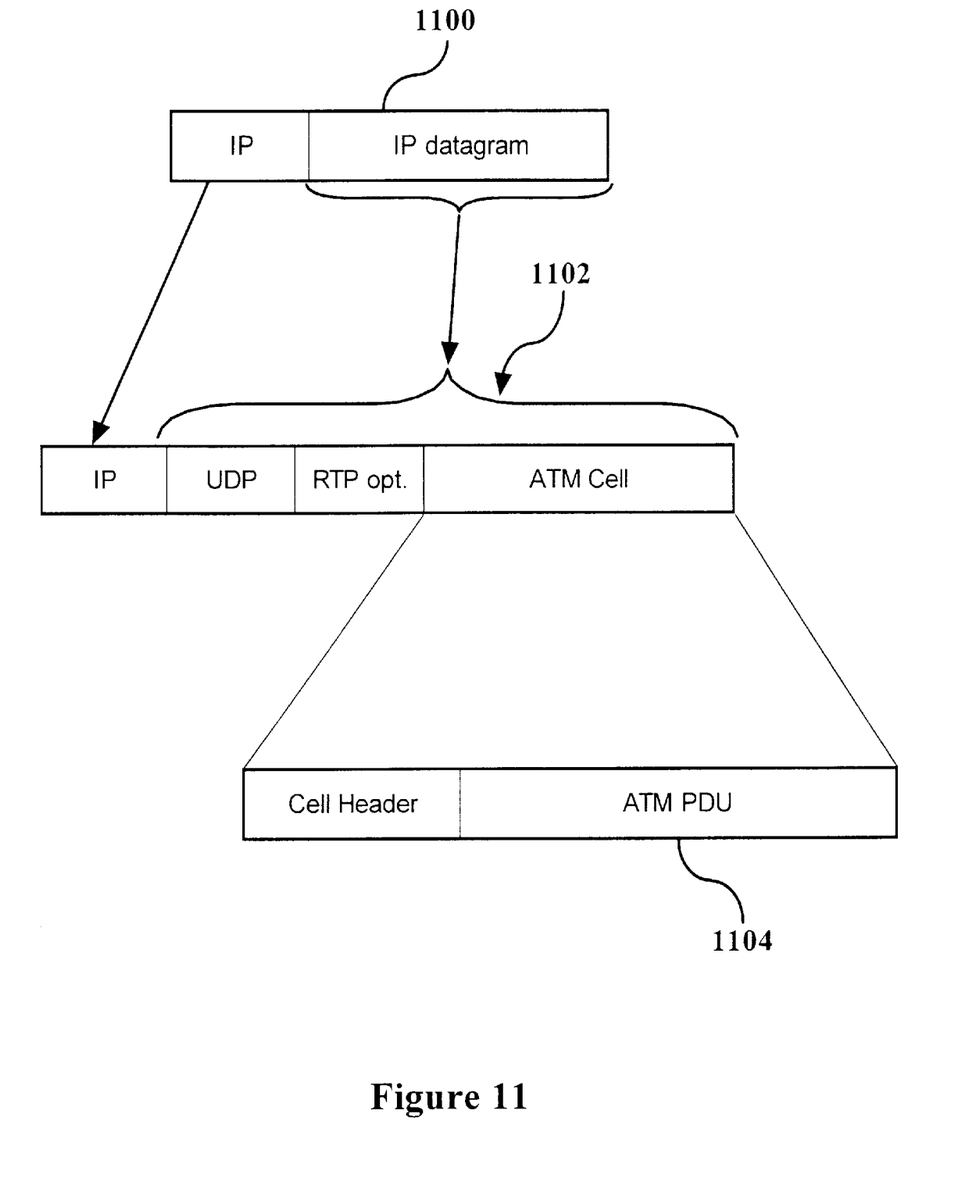
FIG. 11 illustrates the continued flow from FIG. 10 if the mode is ATM over IP.

FIG. 11 illustrates the continued flow from FIG. 10 if the mode is ATM over IP.

(15) Remove the RTP/UDP/IP 1102.

(16) Send the cell through port number #port 1104.

ATM is a connection-oriented technology. ATM cells are transported over the network by setting up virtual channel connections (VPI.VCI=VCC) or virtual path (VPI=VP) between the UNI's of two subscribers wishing to communicate.

The ATM-SSCS can support multiple connections multiplexing using the VCC/VP fields. In addition, the IP layer supports connection multiplexing using its UDP/IP address. There are two methods of multiplexing ATM connections One-to-One and Many-to-One. Those methods can be implemented with IP network as flow:

1. One-to-One: Each ATM VCC/VP connection is mapped to a single UDP/IP address. Multiplexing is performed at the UDP/IP layers. The ATM-SSCS VCC/IP value used for user plane traffic should be agreed upon between the two IP end systems.

2. Many-to-One: Multiple ATM VCC/IP connections are multiplexed into a single UDP/IP address. Multiplexing is accomplished at the ATM-SSCS sublayer using VCCs/VPs. The Many-to-One method may be used only for ATM PVCs that terminate on the same IP-based end systems. The ATM-SSCS VCC/VP value (s) used shall be agreed upon between the two IP end systems.

The RTP is used to keep the order as needed in connection-oriented. To decrease overhead of the IP encapsulation a grouping method can be used; some cells can be grouped together and encapsulated by the same IP frame. The ATM-SSCS map the cells on their VCI/VPI fields, including OAM cells.

The above description of the method to enable ATM over IP and its described functional elements are implemented in various computing environments. For example, the present invention may be implemented on a conventional IBM PC, Macintosh or equivalent, multi-nodal system. (e.g. LAN) or networking system (e.g. Internet, WWW) over embedded CPU. All A, programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of communications programming.

CONCLUSION

A system and method has been shown in the above embodiments for the effective implementation of a ATM over IP. While preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment or specific computing hardware. In addition, the specific sub-layer schemes are representative of the preferred embodiment and should not limit the scope of the invention.

What is claimed is:

1. A computer based communications system implementing ATM over an Internet Protocol network (ATM over IP, ATMoIP), said system comprising:
   an IP network;
   one or more cells of one or more ATM networks or encapsulated protocols operatively connected to said IP network;
   interworking functions operatively connected to or between either of said IP backbone network or ATM networks, and
   wherein said interworking functions include a conversion of said one or more cells to an IP compatible format suitable for transfer over said IP network,
   wherein said conversion utilizes a port look-up table and a VCC look-up table, and
   wherein said port look-up table comprises a port number index and corresponding VCC pointer table indicator.

2. A computer based communications system implementing ATM over an Internet Protocol network (ATM over IP, ATMoIP) as per claim 1, wherein said VCC look-up table includes a VCC index, mode determination, RDP/UDP/IP destination, UDP source, and MAC source.

3. A computer based communications system implementing ATM over an Internet Protocol network (ATM over IP, ATMoIP) as per claim 2, wherein said mode determination includes at least "ATM over IP", "IP over ATM" or "not used" designations.

4. A system implementing, in a computer environment, ATM over IP (ATMoIP) comprising:
   a communications system comprising I/O ATM cells, said I/O ATM cells comprising a port of a first port number;
   a port look-up table, said table comprising a port index and related pointer to a VCC look-up table of said first port number;
   a table to determine a VCC from a header of said Cell;
   said VCC look-up table comprising at least a VCC index and correlating mode determination, said mode comprising any of: IP over ATM, ATM over IP or not used;
   said VCC look-up table further comprising any of: a destination RTP/UDP/IP port, source UDP port and MAC source;
   ATM header converter, said converter including ATM-SSCS;
   first encapsulation element to encapsulate at least one I/O ATM cell in a UDP/IP frame as selected from said VCC look-up table;
   second encapsulation element to sequentially encapsulate said encapsulated UDP/IP frame in a MAC layer;
   transfer element to send said sequentially encapsulated frame to an uplink;
   router to route said sequentially encapsulated frame;
   conversion element to change the destination MAC to the MAC of a GSR and source MAC to an external MAC of said uplink to create a final frame format, and
   an output element sending the final frame out through said uplink port.

5. A system implementing, in a computer environment, ATM over IP (ATMoIP), as per claim 4, wherein said system is implemented locally or remotely on one or more computer-based systems across networks or existing communication mediums.

6. A system implementing, in a computer environment, ATM over IP (ATMoIP), as per claim 4, wherein said system is implemented across networks comprising any of LANs, WANs, cellular, Internet or Web based networks.

7. A system implementing, in a computer environment, ATM over IP (ATMoIP) comprising:
   an IP network comprising one or more IP traffic frames;
   router for routing said IP traffic frames;
   conversion element for changing a destination MAC to the MAC of a VCC and a source MAC to the internal address of an uplink;
   transfer element to send the converted frame to an I/O card;
   said destination MAC comprising a port number and VCC number;
   a VCC look-up table, said VCC look-up table comprising at least a VCC number index and correlating mode determination, said determination mode comprising any of: IP over ATM, ATM over IP or not used;
   termination element for selected VCC's not used, said termination element deleting the IP traffic frame and ending;
   a first decapsulation element removing the MAC layer from the IP traffic frame;
   said VCC look-up table further comprising a destination IP address and UDP port;
   comparator for comparing said destination IP and UDP port with the UDP of the source of said first decapsulation frame; if they are not equal, the frame is deleted, else, the sequence number of an RTP is checked;
   a second decapsulation element sequentially removing the RTP/UDP/IP to create a final cell; and
   transfer element sending said final cell through said port number.

8. A system implementing, in a computer environment, ATM over IP (ATMoIP), as per claim 7, wherein said system is implemented locally or remotely on one or more computer-based systems.

9. A system implementing, in a computer environment, ATM over IP (ATMoIP) as per claim 7, wherein said system is implemented across networks comprising any of LANs, WANs, cellular, Internet or Web based networks.

10. A method of implementing ATM over IP (ATMoIP) comprising the following steps for up and down link flow:
    A. said down link flow of ATM cells from I/O ports comprising the steps:

(1) receiving the cell of a first port number;
(2) finding, by a port look-up table, a pointer to a VCC table of said first port number;
(3) finding, by hash table, an index to a VCC/VP;
(4) determining, by a VCC look-up table, if this VCC configures to IP over ATM, ATM over IP or is not used;
(5) if this VCC mode is not used, deleting the cell and ending;
(6) if the mode is ATM over IP, continuing to step 7;
(7) finding, by said VCC look-up table, a destination RTP/UDP/IP, a source UDP and MAC source;
(8) changing the ATM header, if needed, with optional ATM-SSCS;
(9) encapsulating the frame in UDP/IP as selected from said VCC look-up table;
(10) encapsulating the frame in a MAC layer;
(11) sending the frame to the uplink;
(12) routing the frame;
(13) changing the destination MAC to the MAC of the GSR and source MAC to the external MAC of the uplink, and
(14) sending the frame out through the uplink port;
B. said in flow from the uplink port comprising the steps:
(1) receiving frame from the uplink port;
(2) routing the frame;
(3) changing the destination MAC to the MAC of DLCI and source MAC to the internal address of the uplink;
(4) sending the frame to the I/O card;
(5) finding a second port number and the VCC number from the MAC;
(6) finding, by VCC look-up table, a pointer to the VCC table of the second port;
(7) finding by said VCC look-up table if this VCC configures ATM over IP;
(8) if this VCC is not used, deleting the frame and ending;
(9) removing the MAC layer from the frame;
(10) if the mode is ATM over IP, continuing to step 11;
(11) finding by VCC look up table the destination RTP/UDP/IP;
(12) comparing them with the UDP of the source of that frame;
(13) if they are not equal deleting the frame and ending;
(14) if they are equal, checking the sequence number of the RTP and reorder cell if needed;
(15) removing the RTP/UDP/IP to format as a cell, and
(16) sending the cell through the second port number.

11. A method of implementing ATM over IP (ATMoIP) as per claim 10, wherein said method is implemented locally or remotely on one or more computer-based systems.

12. A method of implementing ATM over IP (ATMoIP) as per claim 10, wherein said method is implemented across networks comprising any of LANs, WANs, cellular, Internet or Web based networks.

13. A method of implementing ATM over IP (ATMoIP) comprising:

capturing an VCC frame with indication of a port of a corresponding VCC port;

determining if a VCC of the frame is configured;

if, no, deleting the frame, else, determining, based on a port match table, if the VCC is configured as an ATM over IP;

if configured as an ATM over IP, determining, based on a VCC look-up table, a MAC address and RTP/UDP/IP port;

translating and encapsulating between ATM layer and RTP/UDP/IP sub-layers;

encapsulating the frame in a Ethernet physical sub-layer;

routing the frame; and changing MAC address, ARP table, and send the frame to an uplink port, I/O card or specific port.

* * * * *